US011340981B2

(12) United States Patent
Shen et al.

(10) Patent No.: US 11,340,981 B2
(45) Date of Patent: May 24, 2022

(54) MODIFYING CONDITIONS FOR MEMORY DEVICE ERROR CONNECTION OPERATIONS

(71) Applicant: MICRON TECHNOLOGY, INC., Boise, ID (US)

(72) Inventors: Zhenlei Shen, Milpitas, CA (US); Tingjun Xie, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/992,563

(22) Filed: Aug. 13, 2020

(65) Prior Publication Data

US 2022/0050743 A1 Feb. 17, 2022

(51) Int. Cl.
| | |
|---|---|
| *G06F 11/00* | (2006.01) |
| *G06F 11/10* | (2006.01) |
| *G06F 11/07* | (2006.01) |
| *G06F 11/32* | (2006.01) |
| *G06F 11/30* | (2006.01) |

(52) U.S. Cl.
CPC ........ *G06F 11/1068* (2013.01); *G06F 11/076* (2013.01); *G06F 11/3037* (2013.01); *G06F 11/3058* (2013.01); *G06F 11/327* (2013.01)

(58) Field of Classification Search
CPC ............... G06F 11/076; G06F 11/1044; G06F 11/0793; G06F 11/00
See application file for complete search history.

(56) References Cited

U.S. PATENT DOCUMENTS

| | | | |
|---|---|---|---|
| 2013/0024605 A1* | 1/2013 | Sharon ................ | G06F 11/1044 711/103 |
| 2015/0135023 A1* | 5/2015 | Mekhanik .......... | G11C 16/3427 714/704 |
| 2016/0162185 A1* | 6/2016 | D'Abreu ................ | G11C 16/10 711/103 |
| 2017/0131947 A1* | 5/2017 | Hoang ................... | G06F 11/00 |

\* cited by examiner

*Primary Examiner* — Charles Ehne
(74) *Attorney, Agent, or Firm* — Lowenstein Sandler LLP

(57) ABSTRACT

A first error rating for a first memory access operation performed for data stored at a memory device operating at a first state is determined. In response to a determination that the first error rating satisfies a first error rating condition associated with the first state of the memory device, a first error correction operation is performed at the memory device. A change of the state of the memory device from the first state to a second state is detected. A second error rating condition associated with the memory device is determined based on the second state of the memory device. A second error rating is determined for a second memory access operation performed at the memory device. In response to a determination that the second error rating satisfies the second error rating condition, a second error correction operation is performed at the memory device.

20 Claims, 7 Drawing Sheets

MODIFYING CONDITIONS FOR MEMORY DEVICE ERROR CONNECTION OPERATIONS

TECHNICAL FIELD

Embodiments of the disclosure relate generally to memory sub-systems, and more specifically, relate to modifying conditions for memory device error correction operations.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
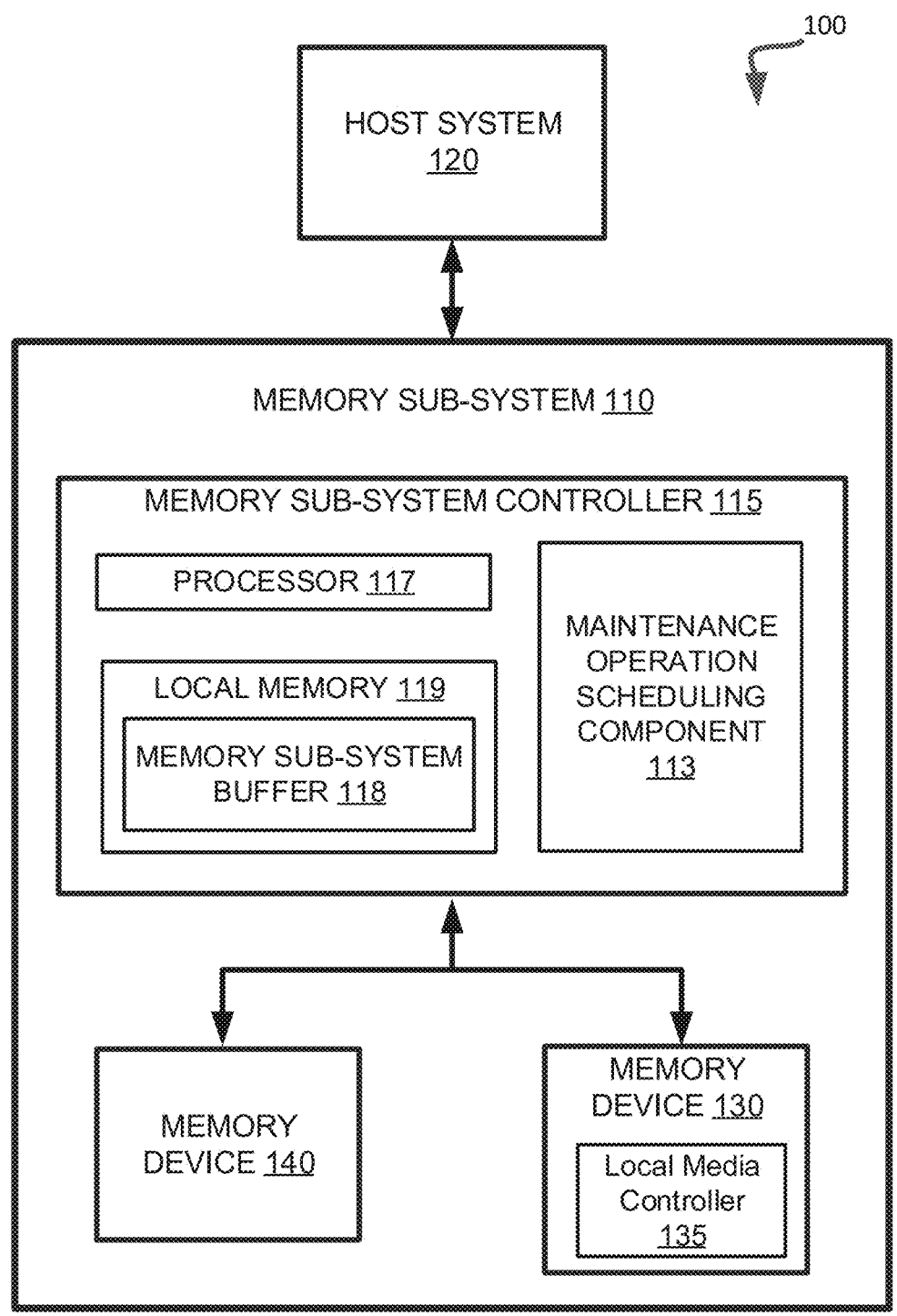
FIG. 1 illustrates an example computing system that includes a memory sub-system, in accordance with some embodiments of the present disclosure.

Aspects of the present disclosure are directed to modifying conditions for memory device error correction operations in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Errors can occur during the performance of a memory access operation (e.g., a read operation, a write operation, an erase operation, etc.) at a memory device. For example, while performing a read operation, a memory sub-system controller can misread bits representing data stored at the memory device (i.e., the stored value is read incorrectly). In another example, one or more bits representing data stored at the memory device can contain errors (i.e., the value is stored incorrectly). Either situation can result in an error during performance of a read operation (e.g., a memory access operation error). Upon detecting that a memory access operation error has occurred, the memory sub-system controller can perform an error correction operation to correct the errors in the data and perform the memory access operation again to access the corrected data. In some instances, an error correction operation can be a memory scrubbing operation, where the memory sub-system controller corrects an error in the data and writes the corrected data back to the memory device.

In some instances, the memory sub-system controller does not perform an error correction operation for each memory access operation that includes an error. In order to conserve memory sub-system resources, the memory sub-system controller can perform an error correction operation for memory access operations including a significant number of errors. In conventional systems, the memory sub-system controller can determine whether to perform an error correction operation by determining whether an error rating for a memory access operation satisfies an error rating condition. An error rating can refer to a number of errors that occur during performance of the memory access operation. The error rating corresponds to a bit error rate (i.e., a number of bits in a stream of data containing an error per a unit of time), a fail bit count (i.e., a number of fail bits activated for data stored at the memory device), an error-correcting code (ECC) word (i.e., a code word or flag that initiates an error-correction operation), and so forth. For example, a memory access operation including a significant number of errors can have a high error rating and a memory access operating including a fewer number of errors can have a low error rating. The error rating condition can be a pre-defined condition that causes the memory sub-system controller to initiate an error correction operation for memory device. For example, the error rating condition can be a bit error rate threshold value. The memory sub-system controller can initiate an error correction operation in response to determining that a bit error rate measured for a memory access operation exceeds the bit error rate threshold value.

In some instances, a state of a memory device can increase an error rating for a memory access operation performed at the memory device. A state of a memory device refers to a snapshot of memory device characteristics at a particular instance in time. For example, a state of a memory device can refer to an operating temperature (i.e., a temperature for an environment surrounding the memory device during operation) of the memory device, a cross temperature (i.e., a difference in temperature across a surface of the memory device) of the memory device, or an amount of time data has been stored at the memory device. In an illustrative example, a memory access operation error rating can be higher when the memory device is operating at a high temperature than when the memory device is operating at a low temperature. In some instances, the error rating for the memory access operation performed when the memory device is operating at the low temperature does not satisfy the error condition while the error rating for the memory access operation performed when the memory device is operating at a high temperature does satisfy the error rating condition, causing the memory sub-system controller to initiate the error correction operation.

Although the state of the memory device can affect an error rating for a memory access operation performed at the memory device, an error correction operation does not always reduce the error rating for subsequent memory access operations performed at the memory device. For example, an operating temperature of a memory device can increase from a low operating temperature to a high operating temperature. As a result of the operating temperature increase, an error rating for memory access operations performed at the higher operating temperature can be higher than error ratings for memory access operations performed at the low operating temperature. Each memory access operation having a higher error rating can cause the memory sub-system controller to perform an error correction operation for the memory device (i.e., by satisfying the error rating condition). However, an error rating for a subsequent memory access operation does not decrease in response to performance of the error correction operation, so long as the memory device is operating at the high operating temperature. As such, each memory access operation performed at the memory device at the higher operating temperature can cause the memory sub-system controller to perform an error correction operation for the memory device even though the error correction operation will not decrease the error rating for subsequent memory access operations.

The error rating condition in conventional memory sub-systems remains the same during the life of the memory sub-system. Thus, a significant number of unnecessary error correction operations (i.e., error correction operations that will not decrease error ratings for subsequent memory access operations) are performed at memory devices of the memory sub-system when the state of the memory device causes a memory access operation error rating to increase. The significant number of unnecessary error correction operations can use a significant number of memory sub-system resources, causing a decrease in overall memory sub-system performance. Further, in some instances, a memory sub-system controller can erase or remove error correction operations from a queue of error correction operations when the memory sub-system controller is not able to perform each error correction operation in the queue within a particular interval of time. As a result, the memory sub-system controller does not perform some necessary error correction operations (i.e., error correction operations that will decrease error ratings for subsequent memory access operations) and does perform some unnecessary error correction operations. As necessary error correction operations are not performed, a significant amount of memory sub-system resources are used to recover data from other portions of the memory sub-system that could have been recovered by a necessary error correction operation, further causing a decrease in overall memory sub-system performance.

Aspects of the present disclosure address the above and other deficiencies by modifying error rating conditions based on a state or behavior of a memory device. In response to performing a first memory access operation at the memory device (e.g., a read operation, a write operation, or an erase operation), the memory sub-system controller can determine a first error rating for the first memory access operation. In response to determining the first error rating satisfies a first error rating condition, the memory sub-system controller can perform a first error correction operation for the data at the memory device. For example, the memory sub-system controller can perform the first error correction operation in response to determining that a bit error rate for the first memory access operation exceeds a bit error rate threshold. The memory sub-system controller can detect that a state of the memory device has changed from a first state (e.g., the first operating temperature) to a second state (e.g., a second operating temperature). The memory sub-system controller can determine a second error rating condition associated with the memory device based on the second state of the memory device. In some embodiments, the first error rating condition can be a first error rating threshold and the second error rating condition can be a second error rating threshold that is larger than the first error rating threshold. In response to performing a second memory access operation at the memory device, the memory sub-system controller can determine a second error rating for the second memory access operation. In response to determining the second error rating satisfies the second error rating condition, the memory sub-system controller can perform the second error correction operation.

In some embodiments, a behavior of the memory device can change during operation of the memory sub-system. A behavior of the memory device can refer to a quality of data stored at the memory device (e.g., a number of errors present in said data) and/or an efficiency of a memory access operation performed at the memory device. A behavior of the memory device can be measured based on an average error rating for memory access operations performed at the memory device or a number of error correction operations performed for the memory device within a particular interval of time. In some embodiments, the behavior of the memory device can change in response to a change of a state of the memory device, as previously described. In other or similar embodiments, the behavior of the memory device can change for other reasons. In such embodiments, the memory sub-system controller can modify an error rating condition for the memory device in response to a change in the behavior of the memory device. The memory sub-system controller can determine a first error rating for a first memory access operation, as previously described. In response to determining the first error rating satisfies an error rating condition, the memory sub-system controller can perform a first error correction operation. The memory sub-system controller can determine that a behavior of the memory device has changed from a first behavior level (e.g., a first average error rating, a first number of maintenance operations performed within a particular interval of time, etc.) to a second behavior level (e.g., a second average error rating, a second number of maintenance operations performed within a particular interval of time, etc.). In such embodiments, the memory sub-system controller can modify the error rating condition associated with the memory device. The memory sub-system controller can calculate a second error rating for a second memory access operation performed at the memory device. In response to determining the second error rating satisfies the modified error rating condition, the memory sub-system controller can perform a second error correction operation for the memory device.

Advantages of the present disclosure include, but are not limited to, a decrease in a number of unnecessary error correction operations performed at a memory device. By modifying the error rating condition based on a state or behavior of the memory device, an appropriate number of memory access operations can cause the memory sub-system controller to perform an error correction operation, reducing the number of unnecessary error correction operations performed at the memory device. By reducing the number of unnecessary error correction operations performed at the memory device, a significant number of resources are made available to the memory sub-system that would otherwise be used to perform the unnecessary error correction operations, causing an increase in overall system performance. Further, the memory sub-system controller will not remove error correction operations from the error correction queue, ensuring that necessary error corrections to be performed. As a result of necessary error corrections being performed at the memory device, memory sub-system resources are less frequently used to recover data from other portions of the memory sub-system, resulting in a further increase in overall system performance.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAIVI), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes an error correction operation component 113 that facilitates the performance of error correction operations for memory devices 130, 140 during operation of memory sub-system 110. In some embodiments, the memory sub-system controller 115 includes at least a portion of the error correction operation component 113. For example, the memory sub-system controller 115 can include a processor 117 (processing device) configured to execute instructions stored in local memory 119 for performing the operations described herein. In some embodiments, the error correction operation component 113 is part of the host system 110, an application, or an operating system. In other embodiments, local media controller 135 includes at least a portion of error correction operation component 113 and is configured to perform the functionality described herein.

The error correction operation component 113 can facilitate scheduling an error correction operation (e.g., a memory scrubbing operation) based on a state or a behavior of memory device 130, 140. A state of a memory device refers to a snapshot of device characteristics (e.g., an operating temperature, a cross temperature, amount of time data has been stored to memory device 130, 140, etc.) at a particular instance of time, such as when memory sub-system controller 115 performs a memory access operation (e.g., a read operation, a write operation, an erase operation, etc.) at memory device 130, 140. A behavior refers to a quality of data stored at memory device 130, 140 and/or an efficiency of a memory access operation performed at memory device 130, 140. Error correction operation component 113 can use an error rating condition to determine whether to initiate an error correction operation for memory device 130, 140, in response to performing a memory access operation. In some embodiments, the error rating condition can be a first error rating condition associated with a first state of the memory device 130, 140. In response to detecting a change in the state of the memory device 130, 140 from the first state to a second state (e.g., a first operating temperature to a second operating temperature), error correction operation component 113 can determine, based on the second state, a second error rating condition to use to determine whether to perform an error correction operation.

In other or similar embodiments, error correction operation component 113 can determine that a behavior of the memory device has changed from a first behavior level to a second behavior level (e.g., a first average error rating to a second average error rating). Error correction operation component 113 can modify the error rating condition, based on the change from the first behavior level to the second behavior level, and use the modified error rating condition to determine whether to perform an error correction operation. Further details with regards to the operations of the error correction operation component 113 are described below.

Figure 2:
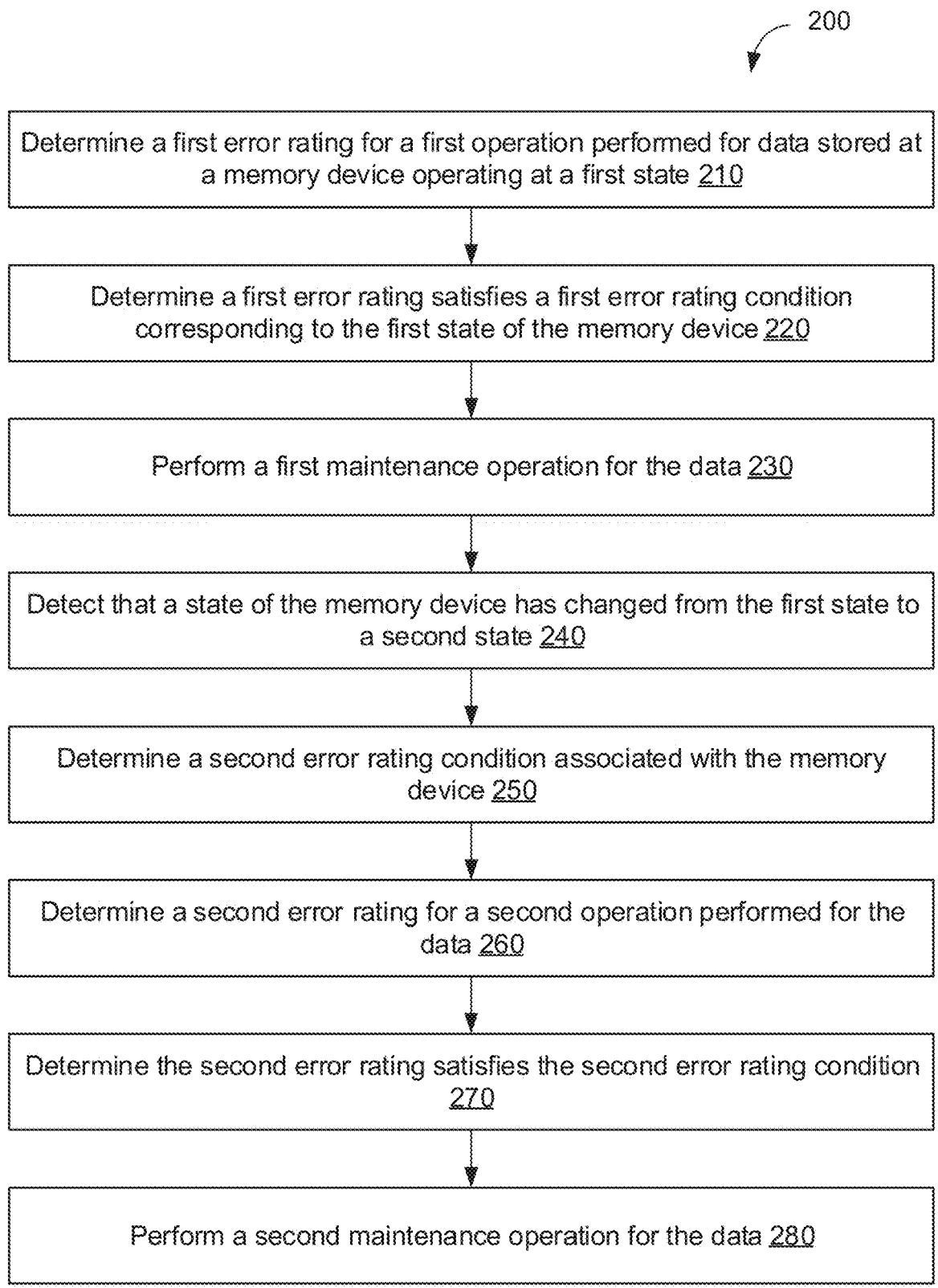
FIG. 2 is a flow diagram of an example method to modify an error correction operation condition for a memory device, in accordance with some embodiments of the present disclosure.

FIG. 2 is a flow diagram of an example method 200 to determine an error correction operation condition for a memory device, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof In some embodiments, the method 200 is performed by the error correction operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic calculates a first error rating for a first memory access operation performed at a memory device operating at a first state. The memory device can be memory device 130, 140 illustrated in FIG. 4A. In some embodiments, memory device 130, 140 can included one or more portions 410. In some embodiments, each portion 410 can be a block (i.e., a particular unit of memory device 130, 140 allocated to store data) of memory device 130, 140. In other or similar embodiments, each portion 410 can be larger than or smaller than a block of memory device 130, 140. As described previously, the first memory access operation can be a read operation, a write operation, an erase operation, and so forth. The processing logic of FIG. 2 (e.g., error correction operation component 113 of memory sub-system controller 115) can calculate the first error rating in response to memory sub-system controller 115 performing the first memory access operation at a portion 410 (e.g., portion 410A) of memory device 130, 140. The first error rating can correspond to a bit error rate, a fail bit count, or an ECC word for the first memory access operation performed at portion 410.

Referring back to FIG. 2, at operation 220, the processing logic (e.g., error correction operation component 113) determines the first error rating satisfies a first error rating condition corresponding to the first state of the memory device. In some embodiments, the first error rating condition corresponds to a first error rating threshold. In such embodiments, error correction operation component 113 determines the first error rating satisfies the first error rating condition responsive to determining the first error rating exceeds a first error rating threshold. The first error rating threshold can be a previously defined error rating threshold associated with a target behavior of memory device 130, 140. For example, the first error rating threshold can be a bit rate threshold associated with a target bit error rate for data read from a portion 410 of memory device 130, 140.

In some embodiments, the first error rating condition is associated with a first state of the memory device. For example, the first state can be a first operating temperature of memory device 130, 140. In another example, the first state of memory device 130, 140 can correspond to a first amount of time the data has been stored at a portion 410 of memory device 130, 140. In other or similar embodiments, the first error rating condition is not associated with a first state of memory device 130, 140. For example, the first error rating condition can be a default error rating condition that is set by the memory sub-system controller 115 during initialization of memory device 130, 140.

At operation 230, the processing logic (e.g., error correction operation component 113) performs a first error correction operation (e.g., a memory scrubbing operation, etc.) at memory device 130, 140. In some embodiments, the data accessed during performance of the first memory access operation is included in a first portion 410A of memory device 130, 140. In such embodiments, error correction operation component 113 can perform the first error correction operation for all data stored at the first portion 410A of memory device 130, 140.

At operation 240, the processing logic (e.g., error correction operation component 113) detects that a state of the memory device has changed from the first state to a second state. As described previously, the first state can be a first operating temperature of memory device 130, 140. In such embodiments the second state can be a second operating temperature of memory device 130, 140. In other or similar embodiments, the first state can correspond to a first amount of time data has been stored at a portion 410 of memory device 130, 140. In such embodiments, the second state can correspond to a second amount of time data has been stored at a portion 410 of memory device 130, 140.

In some embodiments, error correction operation component 113 can detect that the state of the memory has changed from the first state to the second state based on a notification received by memory sub-system controller 115. For example, memory sub-system controller 115 can receive a notification (e.g., from a temperature sensor of memory sub-system 110) that an operating temperature of memory device 130, 140 has increased from the first operating temperature to the second operating temperature.

In other or similar embodiments, error correction operation component 113 can detect that the state of the memory has changed from a first state to the second state using a metadata structure (not shown) maintained by memory sub-system controller 115. In some embodiments, memory sub-system controller 115 can track a state of memory device 130, 140. For example, memory sub-system controller 115 can include or be coupled to a device (e.g., a clock) configured to measure an amount of time data has been stored at a memory device 130, 140. In some embodiments, memory sub-system controller 115 can maintain the metadata data structure to store metadata associated with data stored at memory device 130, 140. For example, the metadata data structure can include an amount of time (i.e., measured by the clock) that data has been stored at a particular portion 410 of memory device 130, 140. Error correction operation component 113 can detect that the state of the memory has changed from a first state to a second state based on an amount of time data has been stored at the portion 410 of memory device 130, 140, as included in the metadata data structure. For example, at a first instance in time, error correction operation component 113 can determine, using the metadata data structure, that data has been stored at portion 410A of memory device 130, 140 for a first amount of time (e.g., less than one year) corresponding to a first state of memory device 130, 140. At a second instance in time, error correction operation component 113 can determine, using the metadata data structure, that data has been stored at portion 410A of memory device 130, 140 for a second amount of time (e.g., more than one year) corresponding to a second state of memory device 130, 140. As such, error correction operation component 113 can detect, using the metadata data structure, that the state of memory has changed from the first state to the second state.

In other or similar embodiments, error correction operation component 113 can detect that the state of the memory has changed from the first state to the second state in accordance with other techniques or implementations. For example, error correction operation component 113 can detect that the state of the memory has changed from the first amount of time data has been stored at portion 410 of memory device 130, 140 to a second amount of time data has been stored at portion 410 of memory device 130, 140 without using a metadata data structure.

At operation 250, the processing logic (e.g., error correction operation component 113) determines a second error rating condition associated with memory device 130, 140. Error correction operation component 113 can determine the second error rating condition based on the second state of memory device 130, 140. In some embodiments, the second error rating condition can correspond to a second error rating threshold. The second error rating threshold can be different from a first error rating threshold associated with the first error rating condition. For example, the second error rating threshold can be larger than the first error rating threshold. In another example, the second error rating threshold can be smaller than the first error rating threshold.

Figure 4A:
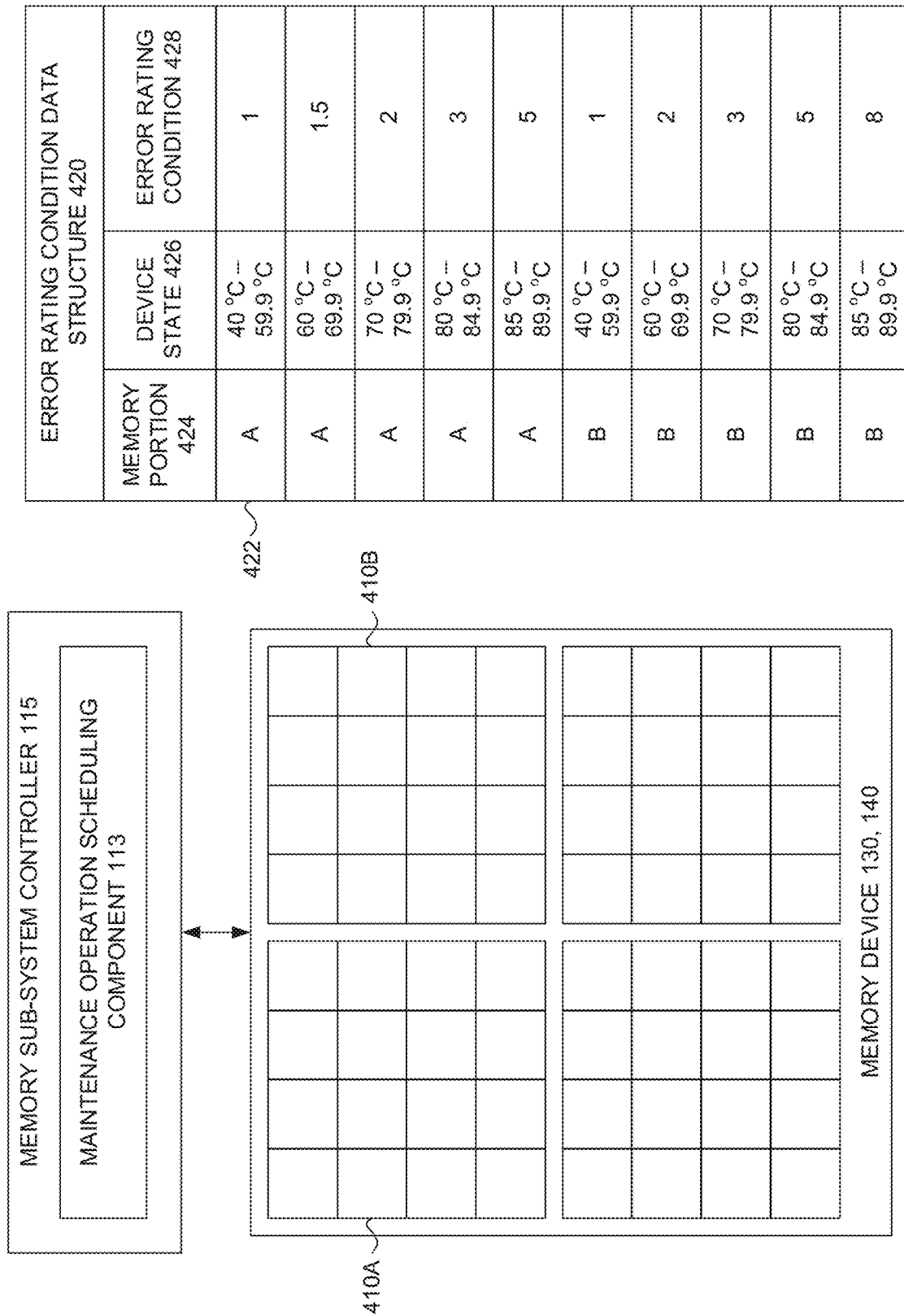
FIGS. 4A-4C illustrate modifying an error correction operation condition for a memory device, in accordance with some embodiments of the present disclosure.
Figure 4B:
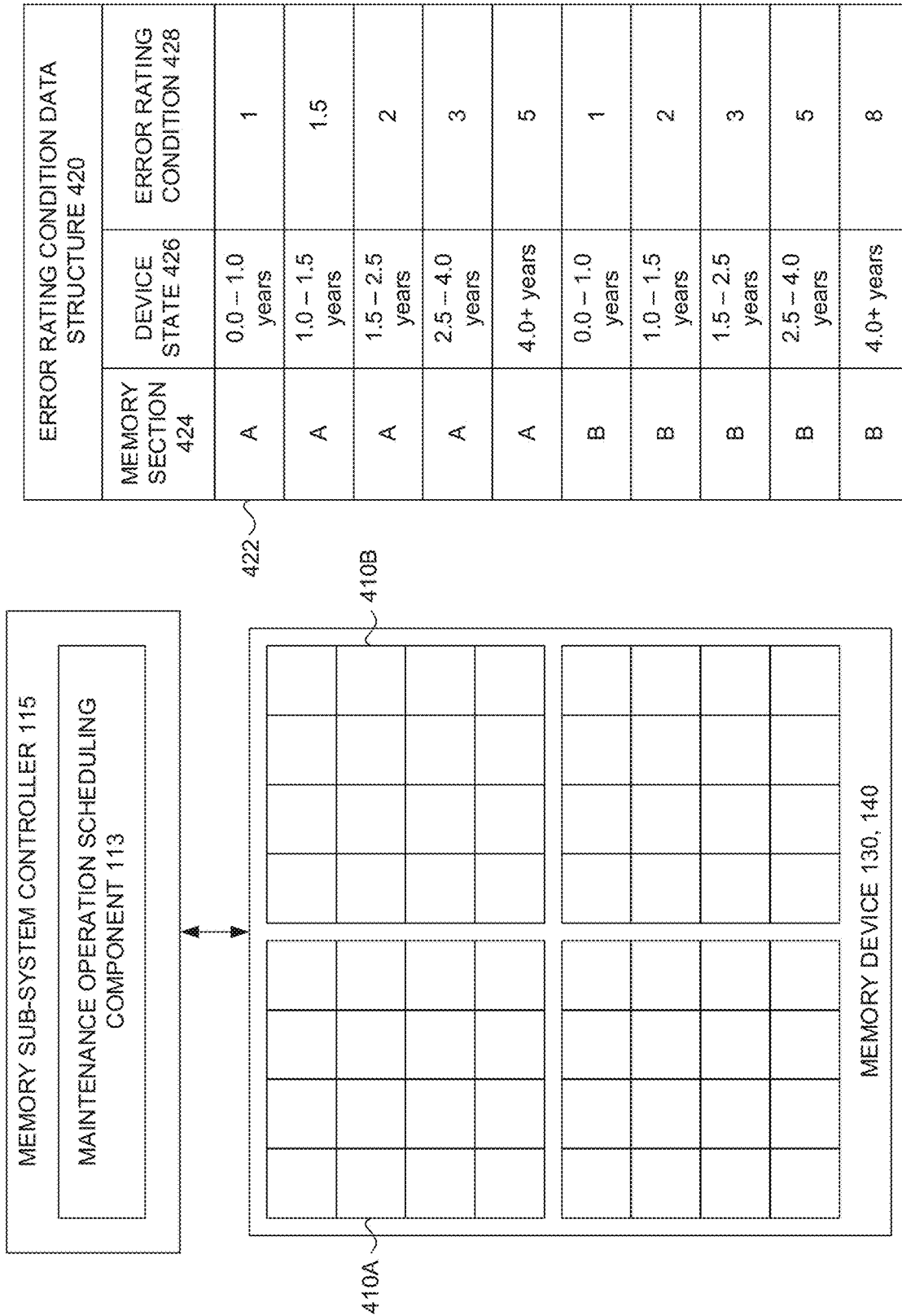

In some embodiments, error correction operation component 113 can determine a second error rating condition based on the second state of the memory device using an error rating condition data structure, such as error rating condition data structure 420 of FIGS. 4A and 4B. Error rating condition data structure 420 can include multiple entries 422 associated with a portion 410 of memory device 130, 140. Each entry 422 can include a memory section field 424, a device state field 426, and an error rating condition field 428. The memory section field 424 of an entry 422 can include an identifier for a portion 410 of memory device 130, 140 (e.g., portion 410A, 410B, etc.). The device state field 426 can include a state of memory device 130, 140 or data stored at a portion of memory device 130, 140. For example, as illustrated in FIG. 4A, the device state field 426 for each entry 422 can include a range of operating temperatures of the memory device. In another example, as illustrated in FIG. 4B, the device state field 426 for each entry 422 can include a time interval corresponding to an instance in time data was stored to a portion 410 of memory device 130, 410. The error rating condition field 428 can include an error rating condition that is to be applied to the portion 410 of memory device 130, 140, based on a state of memory device 130, 140.

In an illustrative example, as illustrated in FIG. 4A, an error rating condition of 1.0 is to be applied to portion 410A of memory device 130, 140 when the operating temperature of memory device 130, 140 is between approximately 40° C. to approximately 59.9° C. An error rating condition of 1.5 is to be applied to portion 410A when the operating temperature of memory device 130, 140 is between approximately 60° C. to approximately 69.9° C. In another example, as illustrated in FIG. 4B, an error rating condition of 1.0 is to be applied to portion 410B when data has been stored to portion 410B for between approximately 0.0 years to approximately 1.0 years. An error rating condition of 2.0 is to be applied to portion 410B when data has been stored to portion 410B for approximately 1.0 years to approximately 1.5 years.

In some embodiments, the error rating condition of error rating condition field 428 can be provided by a programmer or developer of one or more portions of error correction operation component 113. In other or similar embodiments, error correction operation component 113 can determine the error rating condition of error rating condition field 428 based on error rating conditions used for another memory device of memory sub-system 110, or another memory sub-system.

In response to detecting a state of memory device 130, 140 has changed from a first state to a second state, error correction operation component 113 can identify an entry of error rating condition data structure 420 with a device state field 426 that includes a state corresponding to the second state of memory device 130, 140. For example, the operating temperature of memory device 130, 140 can increase from 45° C. to 82° C. Error correction operation component 113 can identify first entry 422 of error rating condition data structure 420, where the device state field 426 of first entry 422 corresponds to the second state of memory device 130, 140. Error correction operation component 113 can determine the second error rating condition based on the entry 422 of the error rating condition data structure 420. In accordance with the previous example, error correction operation component 113 can determine the second error rating condition based on the error rating condition included in error rating condition field 428 of first entry 422A (e.g., an error rating of 3.0).

In other or similar embodiments, error correction operation component 113 can determine the second error rating condition using an error rating condition function. The error rating condition function can receive, as an input, a state of the memory device and provide, as an output, an error rating condition. The error correction operation component 113 can apply the second state of memory device 130, 140 to the error rating condition function as an input and receive, as an output, the second error rating condition.

At operation 260, the processing logic calculates a second error rating for a second memory access operation (e.g., a read operation, a write operation, an erase operation, etc.) performed at the memory device. In some embodiments the second error rating corresponds to a bit error rate, a fail bit count, or an ECC code word for the second memory access operation. At operation 270, the processing logic determines the second error rating satisfies the second error rating condition, in accordance with previously described embodiments. At operation 280, the processing logic performs a second error correction operation (e.g., a memory scrubbing operation, a memory refresh operation, etc.) for the data. As described previously, data subject to the first memory access operation can be stored at portion 410A. In some embodiments, data subject to the second memory access operation can also be stored at portion 410A. In such embodiments, error correction operation component 113 performs the second error correction operation for all data stored at the portion 410A of memory device 130, 140.

In some embodiments, the error correction operation component 113 further detects that the state of memory device 130, 140 has changed from the second state back to a third state. In some embodiments, the third state can be the same as the first state. In other or similar embodiments, the third state can be different from the first state.

In accordance with the previous example, the state of memory device 130, 140 can change from the second operating temperature of 82° C. to the first operating temperature of 45° C. The first operating temperature of 45° C. can be associated with an error rating condition of 1.0. In response to detecting the operating temperature has changed to the first operating temperature, the error correction operation component 113 can determine the error correction operation component 113 is to use the first error rating condition to determine whether to initiate an error correction operation for a portion 410 of memory device 130, 140.

In another example, the state of memory device 130, 140 can change from the second operating temperature of 82° C. to a third operating temperature of 63° C. The third operating temperature of 63° C. can be associated with a third error rating condition of 1.5. In response to detecting the operating temperature has changed to the third operating temperature, the error correction operation component 113 can determine the error correction operation component 113 is to use the third error rating condition, in accordance with previously described embodiments, to determine whether to initiate an error correction operation for a portion 410 of memory device 130, 140.

In response to performing a third operation at memory device 130, 140, error correction operation component 113 can calculate a third error rating of the third memory access operation. Responsive to determining the third error rating satisfies a determined error rating condition (i.e., the first error rating condition or the third error rating condition), the processing logic can perform a third error correction operation at memory device 130, 140.

Figure 3:
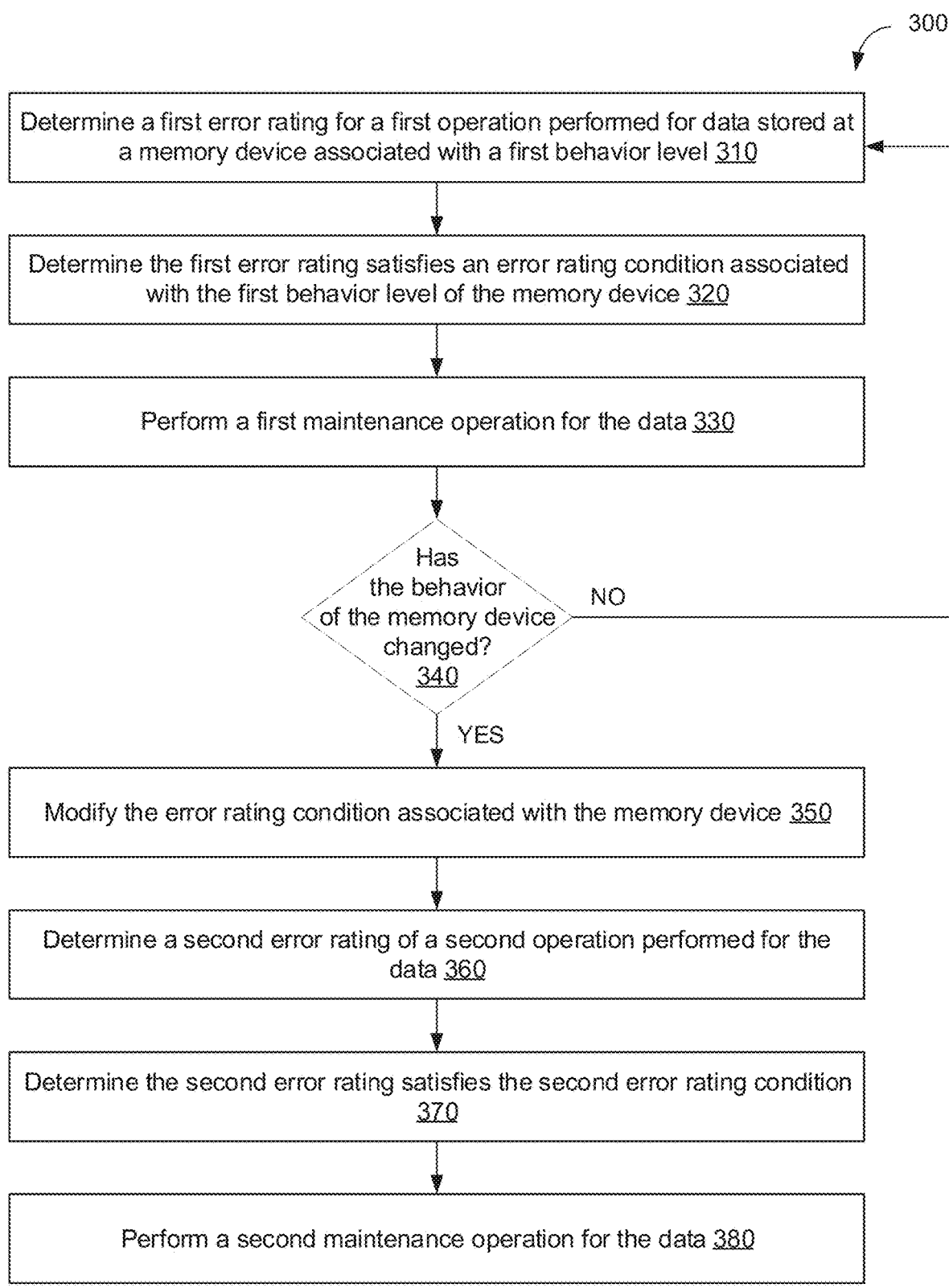
FIG. 3 is a flow diagram of another example method to modify an error correction operation condition for a memory device, in accordance with some embodiments of the present disclosure.

FIG. 3 is a flow diagram of another example method to determine an error correction operation condition for a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof In some embodiments, the method 300 is performed by the error correction operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic calculates a first error rating for a first memory access operation (e.g., a read operation, a write operation, an erase operation, etc.) performed at a memory device associated with a first behavior level. In some embodiments, the memory device can be memory device 130, 140, as illustrated with respect to FIG. 4C. At operation 320, the processing logic determines the first error rating satisfies an error rating condition associated with the first behavior level of the memory device 130, 140, in accordance with previously described embodiments. At operation 330, the processing logic performs a first error correction operation (e.g., a memory scrubbing operation, a memory refresh operation, etc.) at memory device 130, 140, in accordance with previously described embodiments.

At operation 340, the processing logic (e.g., error correction operation component 113) determines whether the behavior of the memory device has changed from the first behavior level to a second behavior level. For example, the behavior of memory device 130, 140 can change from a first average error rating for memory access operations performed at memory device 130, 140 to a second average error rating. In another example, the behavior of memory device 130, 140 can change from a first number of error correction operations performed for data stored at memory device 130, 140, within a particular interval of time, to a second number of error correction operations.

In some embodiments, error correction operation component 113 determines whether the behavior of memory device 130, 140 has changed from a first behavior level to a second behavior level based on the first error rating. Prior to performing the first memory access operation at the memory device, the processing logic can monitor an error rating for multiple memory access operations performed at a portion 410 of memory device 130, 140. In response to performing the first memory access operation, error correction operation component 113 can determine an average error rating for memory device 130, 140 based on the first error rating and each monitored error rating. Error correction operation component 113 can determine whether the average error rating satisfies an average error rating condition. The average error rating condition can correspond to a target average error rating condition during operation of memory device 130, 140. The average error rating can satisfy the average error rating condition by falling below an average error rating threshold associated with the average error rating condition. In some embodiments, the average error rating can be a range of average error rating thresholds. In such embodiments, the average error rating can satisfy the average error rating condition by falling within the range of average error rating thresholds. In response to determining the average error rating satisfies the average error rating condition, error correction operation component 113 can determine the behavior of the memory device has not changed from the first behavior level to the second behavior level and method 300 can return to operation 310. In response to determining the average error rating satisfies the average error rating condition, the processing logic can determine the behavior of memory device 130, 140 has changed from the first behavior level to the second behavior level, and method 300 can continue to operation 350.

In other or similar embodiments, error correction operation component 113 determines whether the behavior of memory device 130, 140 has changed based on the first error correction operation performed at memory device 130, 140. Error correction operation component 113 can determine a number of error correction operations performed at memory device 130, 140 within a particular interval of time before performing the first error correction operation at memory device 130, 140. In some embodiments, the interval of time can correspond to the amount of time memory device 130, 140 has been operating in the memory sub-system 110. In other or similar embodiments, the interval of time can correspond to an amount of time that is less than the amount of time memory device 130, 140 has been operating at the memory sub-system 110. The error correction operation component 113 can determine a total number of error correction operations based on the number of error correction operations performed within the particular interval of time and the first error correction operation performed at memory device 130, 140. The error correction operation component 113 can determine whether the total number of maintenance performed corresponds to a target number of error correction operations. In response to determining the total number of error correction operations corresponds to the target number of error correction operations, error correction operation component 113 can determine the behavior of memory device 130, 140 has not changed from the first behavior level to the second behavior level, and method 300 can return to operation 310. In response to determining the total number of error correction operations does not satisfy the target number of error correction operations condition, error correction operation component 113 can determine the behavior of the memory device has changed from the first behavior level to the second behavior level , and method 300 can continue to operation 350.

At operation 350, the processing logic (e.g., error correction operation component 113) modifies the error rating condition associated with memory device 130, 140. As described previously, the error rating condition can correspond to an error rating threshold value. In such embodiments, error correction operation component 113 can modify the error rating condition by either increasing the error rating threshold value or decreasing the error rating threshold value.

At operation 360, the processing logic calculates a second error rating of a second memory access operation (e.g., a read operation, a write operation, or an erase operation) performed at memory device 130, 140. At operation 370, the processing logic determines the second error rating satisfies the second error rating condition, in accordance with previously described embodiments. At operation 380, the processing logic performs a second error correction operation for the data, in accordance with previously described embodiments.

In some embodiments, error correction operation component 113 can modify the error rating condition for a portion 410 of memory device 130, 140 in order to modify a behavior of memory device 130, 140. For example, error correction operation component 113 can modify the error rating condition for portion 410A to reduce a number of error correction operations memory sub-system controller 115 performs for data stored at portion 410A. In some instances, the modified error rating condition does not modify the behavior of memory device 130, 140 to a target behavior level (e.g., a reduced number of error correction operations per a particular number of operations performed at portion 410A). In such instances, error correction operation component 113 can further modify the error rating condition in order to modify the behavior of memory device 130, 140 to achieve the target behavior level.

Operation log 430 illustrates modifications to error rating conditions made by error correction operation component 113 in response to an operation performed at portion 410A. Operation log 430 includes a memory access operation identifier field 432, a memory portion identifier field 434, a device behavior field 436, and an error rating condition field 428. Operation identifier field 432 identifies a memory access operation performed at a portion 410 of memory device 130, 140, as indicated by memory portion identifier field 434. For example, a first read operation (R1) can be performed at memory portion 410A. Device behavior field 436 indicates a device behavior detected by error correction operation component 113 in response to the behavior of the memory access operation. Device behavior field 436 illustrates a number of error correction operations performed for data stored at portion 410A in response to a particular number of memory access operations performed at portion 410A. For example, in response to the first read operation (R1) being performed at portion 410A, a percentage of error correction operations performed at portion 410A can be approximately 20% of a particular number of memory access operations (e.g., 10, 100, 1000, 100,000, etc.) performed at portion 410A. Error rating condition field 428 indicates an error rating condition applied to portion 410A, in accordance with previously described embodiments.

Figure 4C:
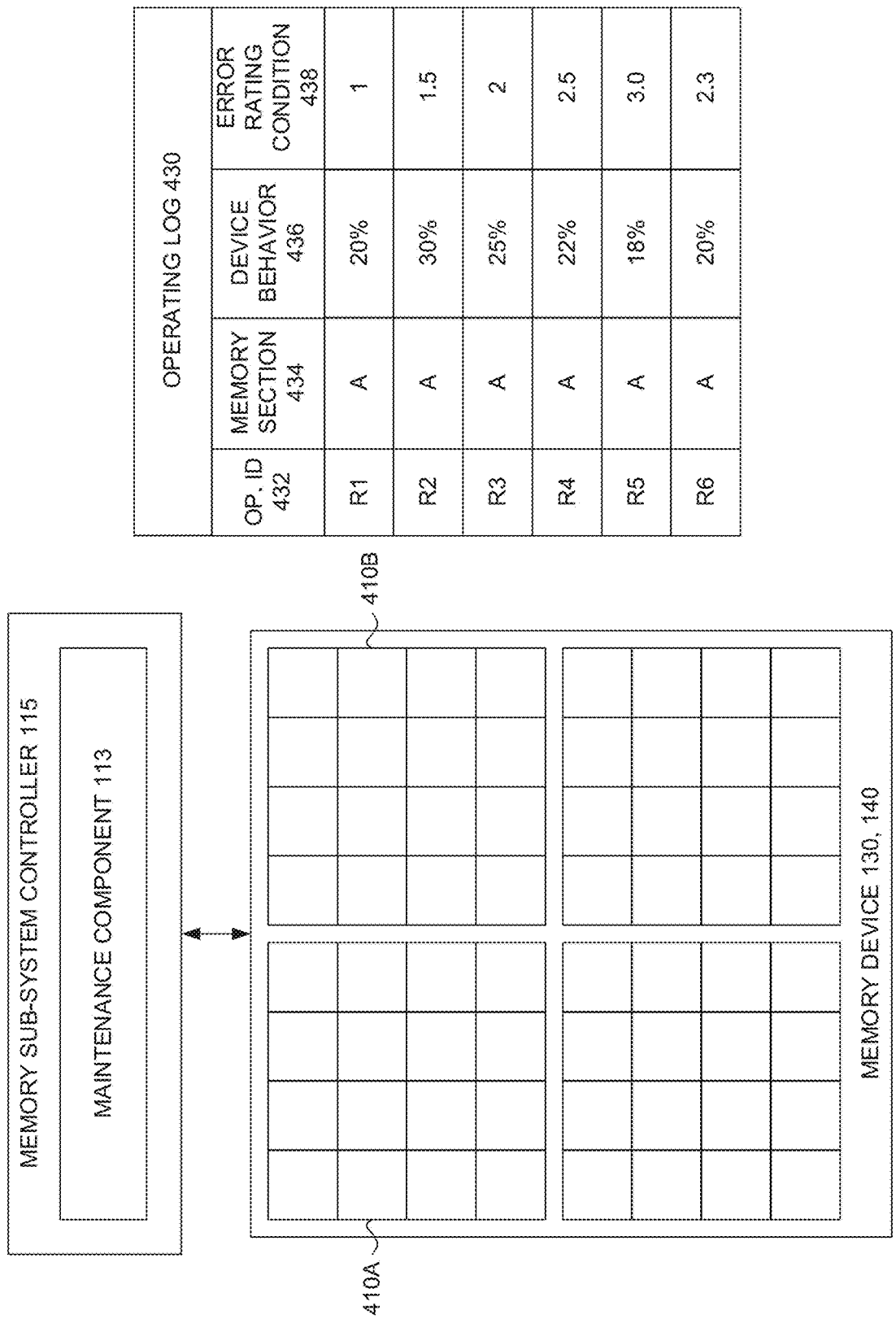

As illustrated in FIG. 4C, the memory sub-system controller 115 can perform a second read operation (R2) at portion 410A of memory device 130, 140. As a result of memory sub-system controller 115 performing the second read operation (R2), error correction operation component 113 can perform an error correction operation for data stored at portion 410A, in accordance with previously described embodiments. The error correction operation performed at portion 410A can cause the percentage of error correction operations performed at portion 410A to increase from 20% to 30%. In response to the percentage of error correction operations performed at portion 410A increasing from 20% to 30%, error correction operation component 113 can increase the error rating condition for portion 410A to 1.5 to decrease the percentage of error correction operations from 30% back to 20%. Error correction operation component 113 can perform a third read operation (R3) at portion 410A. The third read operation does not cause error correction operation component 113 to perform another error correction operation, therefore a percentage of error correction operations performed at portion 410A decreases from 30% to 25%.

Error correction operation component 113 can continue to modify the error condition rating (i.e., by increasing or decreasing the error condition rating) until the behavior of memory device 130, 140 corresponds to the target behavior. For example, the target number of error correction operations performed at portion 410A can be 20% for a particular number of operations performed at portion 410A. As illustrated in FIG. 4C, error correction operation component 113 can modify the error rating condition for portion 410A until the behavior of memory device 130, 140 corresponds to the target behavior level (e.g., the target number of error correction operations performed at 410A is 20%).

Figure 5:
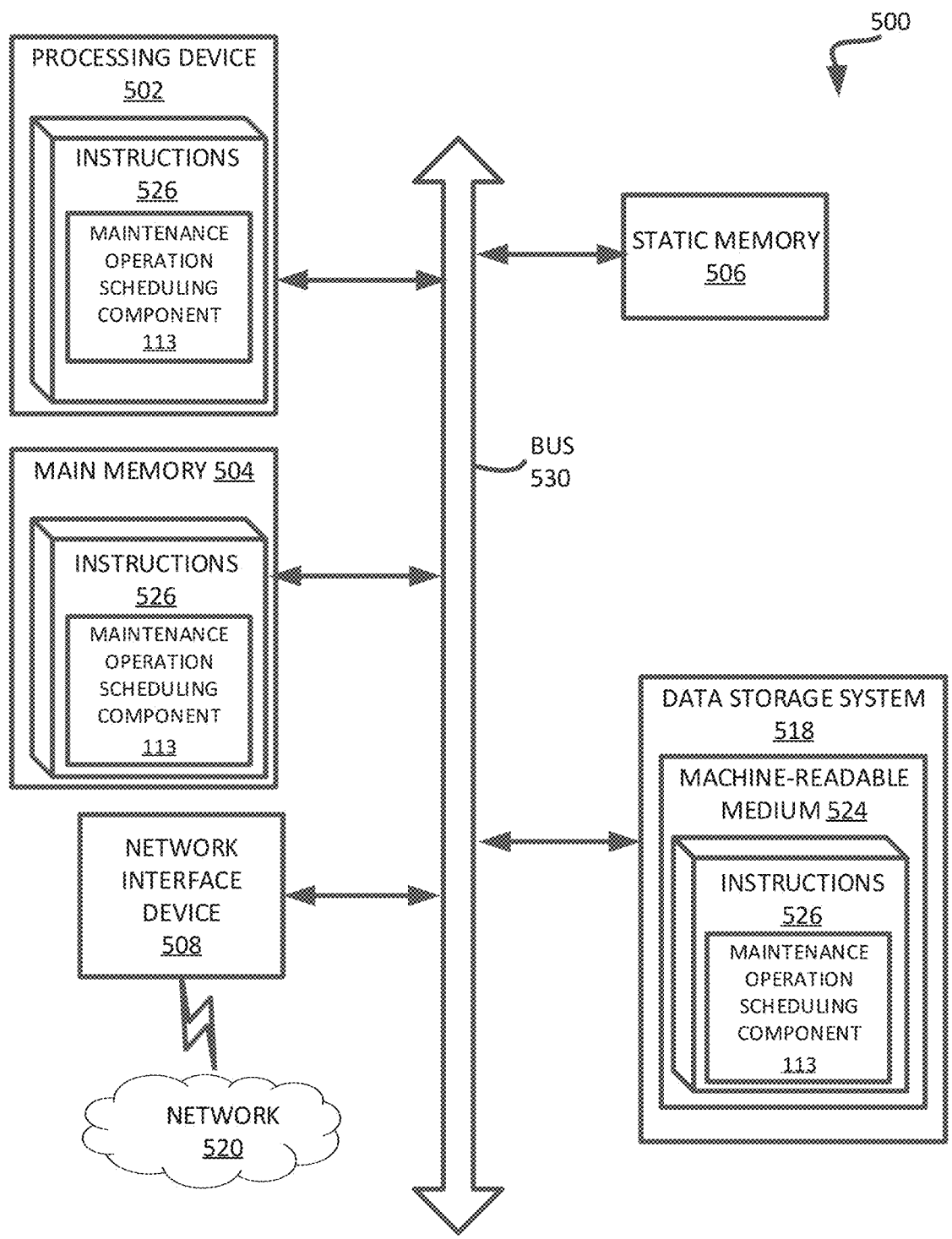
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error control operation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an error correction operation component (e.g., the error correction operation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining a first error rating based on one or more first errors associated with a first memory access operation performed at a memory device operating at a first state;
   responsive to determining that the first error rating satisfies a first error rating condition associated with the first state of the memory device, performing a first error correction operation at the memory device to correct the one or more first errors;
   detecting that a state of the memory device has changed from the first state to a second state;
   determining a second error rating condition associated with the memory device based on the second state of the memory device;
   determining a second error rating based on one or more second errors associated with a second memory access operation performed at the memory device; and
   responsive to determining that the second error rating satisfies the second error rating condition, performing a second error correction operation at the memory device to correct the one or more second errors.

2. The method of claim 1, wherein the first state of the memory device comprises a first operating temperature of the memory device and the second state of the memory device comprises a second operating temperature of the memory device.

3. The method of claim 1, wherein the first state of the memory device corresponds to a first amount of time data has been stored at the memory device and the second state of the memory device corresponds to a second amount of time the data has been stored at the memory device.

4. The method of claim 1, wherein determining the second error rating condition associated with the memory device based on the second state of the memory device comprises:
identifying an entry of an error rating condition data structure, wherein the entry comprises a memory device state corresponding to the second state of the memory device; and
determining the second error rating condition based on the identified entry of the error rating condition data structure.

5. The method of claim 1, wherein determining the second error rating condition associated with the memory device based on the second state of the memory device comprises:
applying the second state of the memory device to an error rating condition function configured to receive, as an input, a state of the memory device and provide, as an output, an error rating condition; and
receiving, as the output of the error rating condition function, the second error rating condition.

6. The method of claim 1, wherein the first error rating condition corresponds to a first error rating threshold value and the second error rating condition corresponds to a second error rating threshold value, and wherein the second error rating threshold value is larger than the first error rating threshold value.

7. The method of claim 1, further comprising:
detecting that the state of the memory device has changed from the second state to a third state;
determining a third error rating condition associated with the memory device based on the third state of the memory device;
determining a third error rating for a third memory access operation performed at the memory device; and
responsive to determining the third error rating satisfies the third error rating condition, performing a third error correction operation error correction operation at the memory device.

8. The method of claim 1, wherein the first error rating and the second error rating each correspond to at least one of a bit error rate, an error correcting code word, or a fail bit count.

9. The method of claim 1, wherein the first memory access operation and the second memory access operation each comprise a read operation.

10. A system comprising:
a memory device; and
a processing device operatively coupled to the memory device, the processing device to perform operations comprising:
determining a first error rating based on one or more first errors associated with a first memory access operation performed for data stored at the memory device associated with a first behavior level;
responsive to determining that the first error rating satisfies an error rating condition associated with the first behavior level of the memory device, performing a first error correction operation at the memory device to correct the one or more first errors;
determining, based on at least one of the first error rating or the first error correction operation performed at the memory device, whether a behavior of the memory device has changed from the first behavior level to a second behavior level;
responsive to determining that the behavior of the memory device has changed from the first behavior level to the second behavior level, modifying the error rating condition associated with the memory device;
determining a second error rating based on one or more second errors associated with a second memory access operation performed at the memory device; and
responsive to determining that the second error rating satisfies the modified error rating condition, performing a second error correction operation at the memory device to correct the one or more second errors.

11. The system of claim 10, wherein to determine, based on the first error rating, whether the behavior of the memory device has changed, the processing device is to perform further operations comprising:
monitoring an error rating for each of a plurality of memory access operations performed at the memory device;
determining an average error rating for the memory device based on the first error rating and each monitored error rating; and
determining whether the average error rating satisfies an average error rating condition,
wherein the processing device is to determine that the behavior of the memory device has changed responsive to determining that the average error rating does not satisfy the average error rating condition.

12. The system of claim 10, wherein to determine, based on the first error correction operation performed at the memory device, whether the behavior of the memory device has changed, the processing device is to perform further operations comprising:
determining a number of error correction operations performed at the memory device based on at least the first error correction operation; and
determining whether the number of error correction operations performed at the memory device satisfies a target number of error correction operations condition,
wherein the processing device is to determine that the behavior of the memory device has changed responsive to determining that the number of error correction operations performed at the memory device does not satisfy the target number of error correction operations condition.

13. The system of claim 10, wherein the error rating condition corresponds to an error rating threshold value, and wherein modifying the error rating condition associated with the memory device comprises at least one of:
increasing the error rating threshold value, or
decreasing the error rating threshold value.

14. The system of claim 10, wherein the first error rating and the second error rating each correspond to at least one of a bit error rate, an error correcting code word, or a fail bit count.

15. The system of claim 10, wherein the first memory access operation and the second memory access operation each comprise a read operation.

16. A non-transitory computer-readable storage medium comprising instructions that, when executed by a processing device, cause the processing device to perform operations comprising:
- determining a first error rating based on one or more first errors associated with a first memory access operation performed for data stored at a memory device, operating at a first state;
- responsive to determining the first error rating satisfies a first error rating condition associated with the first state of the memory device, performing a first error correction operation at the memory device to correct the one or more first errors;
- detecting that a state of the memory device has changed from the first state to a second state;
- determining a second error rating condition associated with the memory device based on the second state of the memory device;
- determining a second error rating based on one or more errors associated with a second memory access operation performed at the memory device; and
- responsive to determining the second error rating satisfies the second error rating condition, performing a second error correction operation at the memory device to correct the one or more second errors.

17. The non-transitory computer-readable storage medium of claim 16, wherein the first state of the memory device comprises a first operating temperature of the memory device and the second state of the memory device comprises a second operating temperature of the memory device.

18. The non-transitory computer-readable storage medium of claim 16, wherein the first state of the memory device corresponds to a first amount of time data has been stored at the memory device and the second state of the memory device corresponds to a second amount of time the data has been stored at the memory device.

19. The non-transitory computer-readable storage medium of claim 16, wherein to determine the second error rating condition associated with the memory device based on the second state of the memory device, the processing device is to perform operations comprising:
- identifying an entry of an error rating condition data structure, wherein the entry comprises a memory device state corresponding to the second state of the memory device; and
- determining the second error rating condition based on the identified entry of the error rating condition data structure.

20. The non-transitory computer-readable storage medium of claim 16, wherein to determine the second error rating condition associated with the memory device based on the second state of the memory device, the processing device is to perform operations comprising:
- providing the second state of the memory device to an error rating condition function configured to receive, as an input, a state of the memory device and provide, as an output, an error rating condition;
- receiving, as the output of the error rating condition function, the second error rating condition.

* * * * *